United States Patent [19]

Stepan

[11] Patent Number: 5,752,789
[45] Date of Patent: May 19, 1998

[54] RIGHT ANGLE PECK DRILL

[75] Inventor: Michael M. Stepan, Bothell, Wash.

[73] Assignee: The Boeing Company, Seattle, Wash.

[21] Appl. No.: 572,946

[22] Filed: Dec. 15, 1995

[51] Int. Cl.$^6$ .................................................. B23B 45/04
[52] U.S. Cl. ...................... 408/17; 408/115 R; 408/129; 408/146; 408/702
[58] Field of Search ...................... 408/17, 72 R, 408/75, 80, 87, 115 R, 115 B, 129, 130, 135, 136, 138, 142, 146, 187, 241 G, 702, 124, 141, 97, 95

[56] References Cited

U.S. PATENT DOCUMENTS

| | | | |
|---|---|---|---|
| 2,439,008 | 4/1948 | Kellem | 408/115 R |
| 2,617,455 | 11/1952 | Kuta . | |
| 2,620,840 | 12/1952 | Schafer . | |
| 2,940,367 | 6/1960 | Cogsdill . | |
| 3,706,506 | 12/1972 | Dorak | 408/130 |
| 3,977,806 | 8/1976 | Kinoshita | 408/141 |
| 4,362,444 | 12/1982 | Watkins | 408/138 X |
| 4,421,441 | 12/1983 | Hirose | 408/17 |
| 4,650,377 | 3/1987 | Biek | 408/130 |
| 5,054,968 | 10/1991 | Eckman | 408/129 X |
| 5,295,770 | 3/1994 | Pennison et al. | 408/17 X |
| 5,340,243 | 8/1994 | Deremo | 408/17 |
| 5,348,428 | 9/1994 | Turner . | |

FOREIGN PATENT DOCUMENTS 2248566   4/1992   Germany ........................... 408/141

*Primary Examiner*—A. L. Pitts
*Assistant Examiner*—Henry W. H. Tsai
*Attorney, Agent, or Firm*—Mary Y. Redman

[57] ABSTRACT

The invention provides a unique approach to solving a peck feeding problem in limited access areas restricting the drilling unit size. It uses a power transmission system which is comprised of a pinion gear driven by a motor source. The pinion gear drives a bevel gear that is free to travel along a polygon quill. A quill had is located on one end of the quill to house the drill. The opposing quill end is attached to a guide bushing assembly. The guide bushing assembly is connected to a bell crank mechanism that is actuated and controlled by a pneumatic piston and hydraulic speed control system. The power transmission system, and the pneumatic power transfer system combined produce a pecking cycle for drilling precision holes within a confined set-up space of 5.5 inches in a preferred embodiment. It preferably has a drill stroke up to 1 inch deep, and is capable of producing a "pecking" action which is unique for right angle drilling equipment in limited access applications.

8 Claims, 2 Drawing Sheets

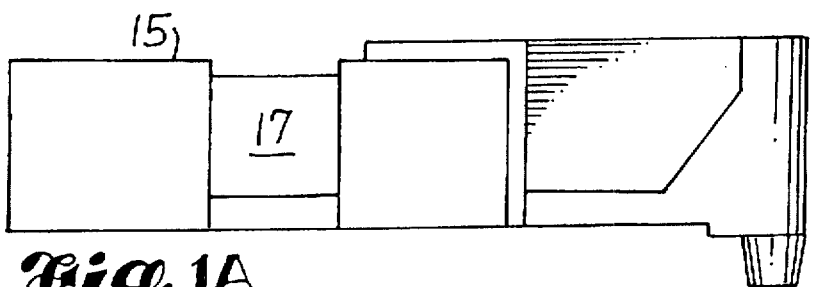
Fig. 1A
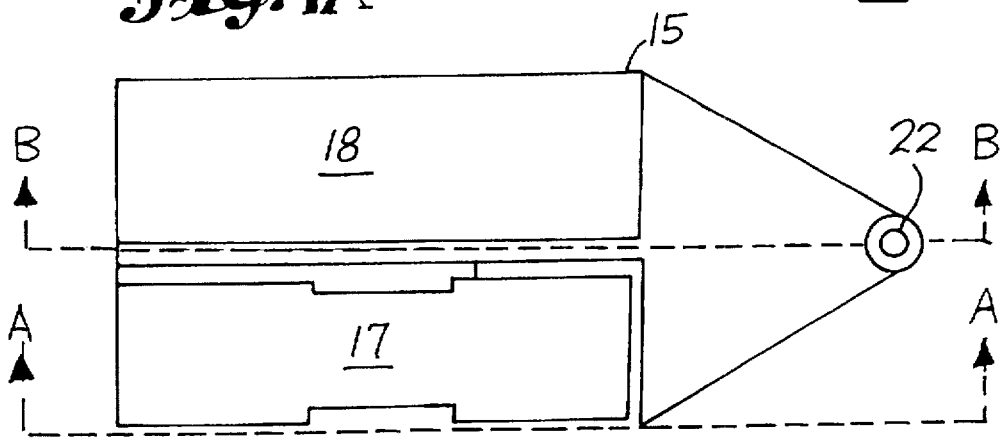
Fig. 1B
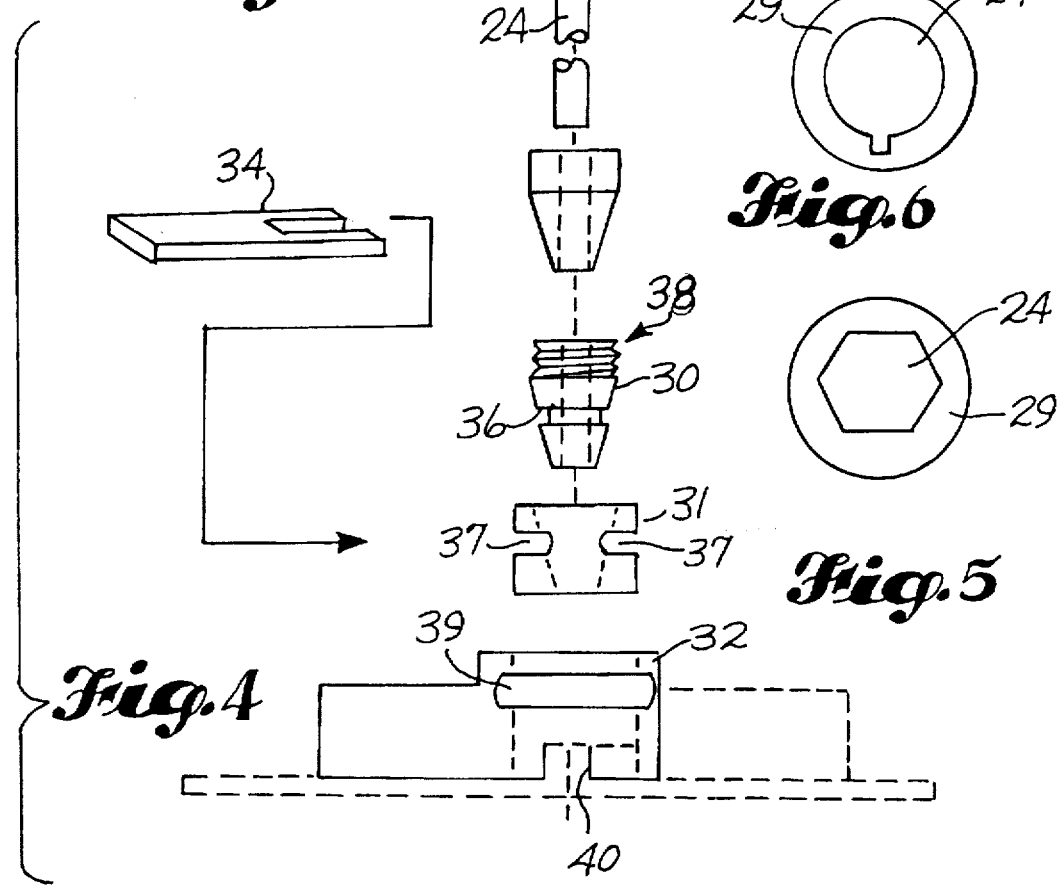
Fig. 6
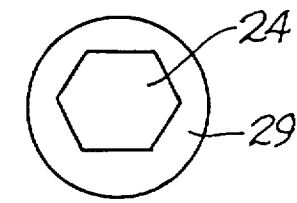
Fig. 5
Fig. 4

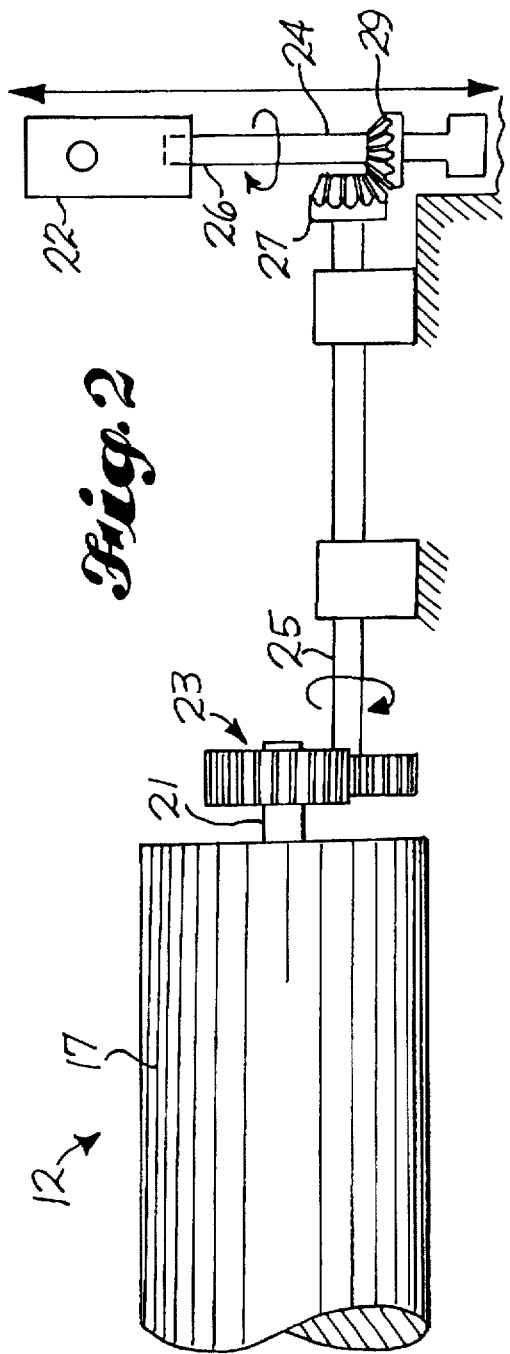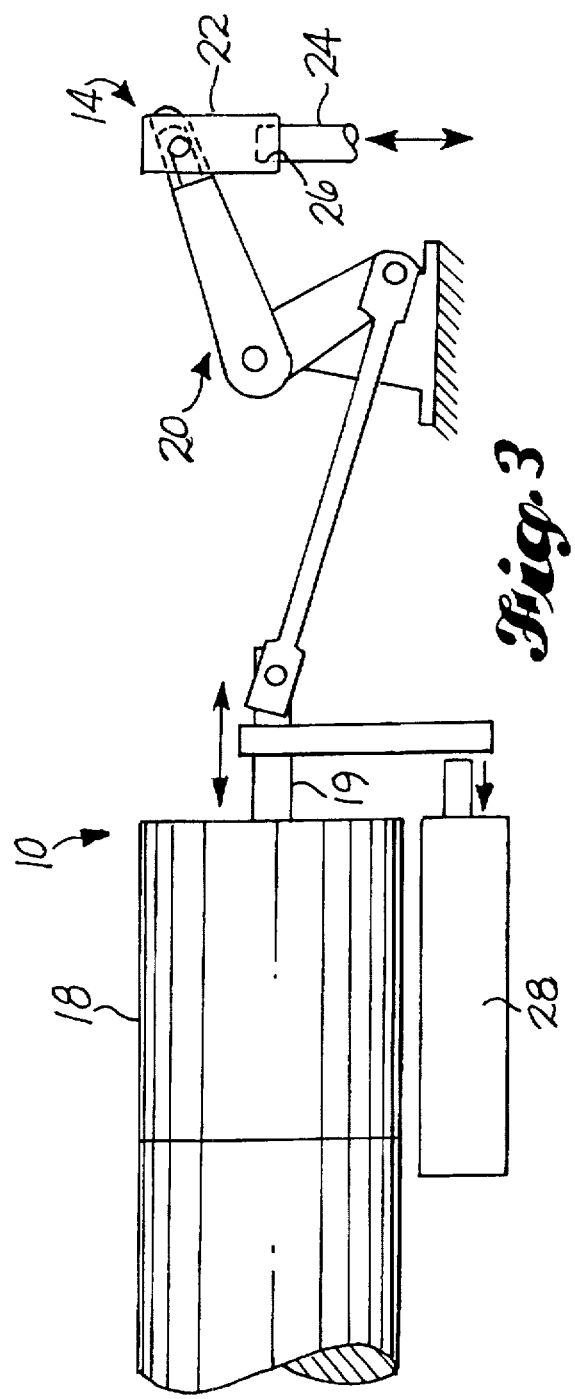

RIGHT ANGLE PECK DRILL

BACKGROUND OF THE INVENTION

1. Field of the Invention

This invention relates to drills for use in manufacturing and more specifically, to peck drills.

2. Background Information

Manufacturing processes often require the drilling of holes of precise size and shape. For example, aircraft structures require the drilling of precisely sized and precisely shaped holes for fasteners. Chips that develop during drilling, however, often erode hole quality, especially in composite stack-ups (i.e., titanium and composite materials nested together for through drilling).

Drilling holes by hand followed by hand reaming to desired sizes ensures good hole quality but obviously is time consuming and expensive. Peck drilling is an automated alternative to achieve quality holes quickly and without hand reaming. In peck drilling, the mechanic merely pushes a start button and the peck drill self-feeds in a pecking action to eliminate chip interference.

Unfortunately, peck drills are too large to fit in some aircraft structures. The smallest commercially available peck drill is about 13 inches in length without nosepiece. With nosepiece and drill plate in place, about 17 to 20 inches access is required to use the peck drill. There are numerous limited access locations on aircraft structures which require precision drilling of holes but may have far less than 17 inches of space available for set-up of a drill.

What is needed is a precision drill which can drill holes of precise size and shape, without hole degradation due to chip interference, in a confined space.

SUMMARY OF THE INVENTION

The invention provides a unique approach to solving a peck feeding problem in limited access areas restricting the drilling unit size. It uses a power transmission system which is comprised of a pinion gear driven by a motor source. The pinion gear drives a bevel gear that is free to travel along a polygon quill. A quill had is located on one end of the quill to house the drill. The opposing quill end is attached to a guide bushing assembly. The guide bushing assembly is connected to a bell crank mechanism that is actuated and controlled by a pneumatic piston and hydraulic speed control system. The power transmission system, and the pneumatic power transfer system combined produce a pecking cycle for drilling precision holes within a confined set-up space of 5.5 inches in a preferred embodiment. It preferably has a drill stroke up to 1 inch deep, and is capable of producing a "pecking" action which is unique for right angle drilling equipment in limited access applications.

In a preferred embodiment, the drill apparatus includes a pneumatic cylinder having an actuator arm; a motor having an output shaft with its axis substantially parallel to the axis of the pneumatic cylinder; a guide piston oriented for linear motion substantially perpendicular to the axis of the pneumatic cylinder; a means such as a bell crank assembly for transferring the motion of the actuator to the guide piston; a gear oriented for rotation in a plane substantially perpendicular to the plane of rotation of the output shaft, and having an aperture formed therethrough; a means for transferring the motion of the output shaft to that gear; and a quill coupled to the guide piston for linear motion therewith and passing through the aperture in the rotating gear. The quill is coupled to the gear for rotational motion therewith by, for example, the quill and aperture having corresponding polygonal shapes.

A preferred embodiment also may include a nose piece assembly made up of a male nosepiece adapted for mounting to the quill, having a conical outer surface and a groove on its circumference; a female nose piece having a correspondingly conical inner surface and a corresponding groove on its circumference, whereby the male and female nosepieces can be placed in mating relationship by alignment of the grooves thereon, and a base adapted for positioning on a workpiece and receiving the female nosepiece. The base has a groove which corresponds to those in the female and male nosepieces so that alignment of the base and nosepieces can be accomplished by alignment of the grooves.

BRIEF DESCRIPTION OF THE DRAWINGS

FIG. 1a is a side and-top view of the exterior of a preferred embodiment of the invention.

FIG. 1b is a top view of the exterior of a preferred embodiment of the invention.

FIG. 2 is a view taken along line A—A of FIG. 1 (with case removed).

FIG. 3 is a view taken along line B—B of FIG. 1 (with case removed).

FIG. 4 is a nose piece assembly and drilling jig useful with the preferred embodiment of FIG. 1.

FIG. 5 is an alternative cross-section of the quill and aperture.

FIG. 6 is an another alternative cross-section of the quill and aperture.

DESCRIPTION OF THE PREFERRED EMBODIMENT

The invention will now be described with reference to a particular preferred embodiment. In the following description, the direction in which the hole is being drilled will be referred to as the vertical direction, although it will be understood that the invention can be used to drill in any desired direction.

With reference to the Figures, a right angle peck drill according to a preferred embodiment includes a pneumatic control system 10, a power transmission system 12 and a pneumatically operated vertical peck system 14, mounted in a case 15.

The pneumatic control system 10 includes a pneumatic cylinder 18 which is coupled by an actuator arm 19 to actuate a bell crank assembly 20. The free end of the bell crank assembly 20 is mounted to a guide piston 22, with a pin in slot arrangement or other suitable mounting means. The bell crank 20 converts the horizontal reciprocating motion of the pneumatic cylinder actuator 19 to a vertical motion imparted to the guide piston 22. The upper end of a spindle or quill 24 is held within an aperture in the guide piston 22, with a bearing 26 between the quill 24 and guide piston 22, to allow the quill 24 to rotate relative to the guide piston. An hydraulic speed control 28 provides a positive feed for the quill and a positive location for the drill to start drilling at each successive peck during the stroke cycle.

The power transmission system includes a motor 17 with its output 21 coupled by spur gears 23 to a shaft 25. Bevel gear 27 on the end of shaft 25 is coupled at right angles to a second bevel gear 29, so as to convert rotary motion from a vertical plane to a horizontal plane.

The spindle or quill 24 passes through a hole in the center of the second bevel gear 29 and is free to move vertically through the bevel gear 29. At the same time, the quill 24 and bevel gear 29 are configured so that rotation of the bevel gear 29 causes rotation of the quill 24. As shown in Figures 5 and 6, this can be accomplished with a quill 24 having a non-circular cross-sectional shape which fits through a conformingly shaped hole in the bevel gear 29. Preferably, this will be a polygon shape. Alternately, a splined shaft can be used for the quill, with a correspondingly keyed bevel hole to have the quill and gear co-rotate.

In operation, the quill 24 will be rotated by the second bevel gear 29 (which in turn is rotated by the motor 17 via spur gears 23, shaft 25, and bevel gear 27) while at the same time the quill is reciprocated in a vertical pecking motion by operation of the bell crank 20 (which transfers the horizontal motion imparted by the pneumatic cylinder to the vertical direction). In a preferred embodiment, the overall vertical dimension from the top of the guide piston 22 to the nose piece is under 4.6 inches and the vertical stroke of the guide piston 22 is about one inch. Thus, the invention in a preferred embodiment provides a peck drill that can be used in structures having very small clearances.

FIG. 4 illustrates a nosepiece for use with the right angle peck drill. It consists of a male and female nosepiece 30, 31 respectively, a base 32 (which holds the female nosepiece), and a prong fork 34.

The nosepieces 30, 31 are cone shaped to facilitate exact alignment, with a 5° angle difference in their angles to prevent the two from sticking together. The male nosepiece 30 has a groove 36 around its circumference while the female nosepiece 31 has slots 37 milled in it to allow the insertion of the forked tool 34. The base 32 has a groove 39, and an aperture 40 for chip removal. The slot 37 in the female nosepiece 31 and the groove 36 in the male nosepiece 30 are milled so as to be slightly offset from each other when the male and female nosepieces are mated. In addition, the fork 34 may have a slight bevel to the top side. When the three pieces are fitted together, the slight offset of the grooves and the slots of the nosepieces and the bevel of the pickle-fork cause the male nosepiece to draw tightly down into the female nosepiece. This prevents misalignment and provides a tight connection.

The male nosepiece 30 is attached to the drill motor by external threads 38 while the female nosepiece 31 is pressed into the base 32. The nosepieces (male and female) and the base may be retrofitted to accept whatever drill design is required and/or whatever base design is required.

In operation, the base is located in the desired location and clamped into place. Location can be accomplished by the use of a bombardier's sight, by measurement, by a simple locating jig, or by the use of pilot holes previously drilled in the part(s). Once the base is located, the drill motor (with the male nosepiece) is inserted into the base assembly and locked into place using the pickle-fork. Drilling is now ready to commence. During drilling, chips can be removed through the aperture 40 by a conventional vacuum or air supply. Following drilling, the above steps are reversed and the base assembly moved to a new drilling location.

While the invention has been described with reference to a preferred embodiment, it will be understood that modification in the construction, arrangement and operation of this preferred embodiment may be made without departing from the spirit and scope of the invention, the scope of which is defined by the following claims.

What is claimed is:

1. A drill apparatus comprising:
   (a) a pneumatic cylinder having an actuator arm;
   (b) a motor having an output shaft with its axis substantially parallel to the axis of the pneumatic cylinder;
   (c) a guide piston oriented for linear motion substantially perpendicular to the axis of said pneumatic cylinder;
   (d) means for transferring the motion of the actuator arm to the guide piston;
   (e) a gear oriented for rotation in a plane substantially perpendicular to the plane of rotation of said output shaft, and having an aperture formed therethrough;
   (f) means for transferring the motion of said output shaft to said gear; and
   (e) a quill coupled to said guide piston for linear motion therewith and passing through the aperture in said gear and coupled therewith for rotational motion therewith.

2. The apparatus of claim 1 further comprising a hydraulic speed control working parallel to said pneumatic cylinder and coupled to the actuator arm of said cylinder.

3. The apparatus of claim 2 wherein the means for transferring motion of the actuator arm to the guide piston includes a bell crank.

4. The apparatus of claim 3 wherein the gear is a bevel gear, and wherein the means for transferring motion of the output shaft to the gear includes a second bevel gear intermeshed therewith.

5. The apparatus of claim 4 wherein the quill and the aperture both have polygonal cross sections.

6. The apparatus of claim 4 wherein the quill includes a spline and the aperture includes a corresponding key.

7. The apparatus of claim 5 further comprising a nose piece assembly including:
   a male nosepiece adapted for mounting to the quill, having a conical outer surface and a groove on its circumference;
   a female nose piece having a correspondingly conical inner surface and a corresponding groove on its circumference, whereby the male and female nosepieces can be placed in mating relationship by alignment of the grooves thereon.

8. The apparatus of claim 7 further comprising a base adapted for positioning on a workpiece and receiving said female nosepiece, and having a groove therein which corresponds to the grooves in said female and male nosepieces whereby alignment of said base and said nosepieces can be accomplished by alignment of said grooves.

\* \* \* \* \*